United States Patent [19]

Yamaguchi et al.

[11] Patent Number: 5,101,689
[45] Date of Patent: Apr. 7, 1992

[54] METHOD OF CONTROLLING SPEED REDUCTION RATIO IN A CONTINUOUSLY VARIABLE SPEED TRANSMISSION

[75] Inventors: Kouji Yamaguchi; Yoshikazu Ishikawa, both of Saitama, Japan

[73] Assignee: Honda Giken Kogyo Kabushiki Kaisha, Tokyo, Japan

[21] Appl. No.: 538,687

[22] Filed: Jun. 13, 1990

Related U.S. Application Data

[63] Continuation of Ser. No. 270,540, Nov. 14, 1988, abandoned.

[30] Foreign Application Priority Data

Nov. 16, 1987 [JP] Japan ................. 62-288943

[51] Int. Cl.$^5$ .................. F16H 59/24; F16H 59/44
[52] U.S. Cl. .................. 74/866; 364/424.1; 474/28
[58] Field of Search ............ 74/866, 867; 364/424.1; 474/18, 28

[56] References Cited

U.S. PATENT DOCUMENTS

| | | | |
|---|---|---|---|
| 4,125,038 | 11/1978 | Hirmatsu | 74/869 |
| 4,261,229 | 4/1981 | Mizuno et al. | 74/866 |
| 4,589,302 | 5/1986 | Oda et al. | 74/877 X |
| 4,663,990 | 5/1987 | Itoh et al. | 74/877 X |
| 4,680,990 | 7/1987 | Ohgami | 74/866 X |
| 4,682,518 | 7/1987 | Takada et al. | 74/877 X |
| 4,700,590 | 10/1987 | Omitsu | 74/857 |
| 4,730,523 | 3/1988 | Takahashi | 74/877 X |
| 4,764,155 | 8/1988 | Kumura et al. | 474/12 |
| 4,793,217 | 12/1988 | Morisawa et al. | 74/867 X |
| 4,803,900 | 2/1989 | Ohkumo | 74/867 X |
| 4,811,225 | 3/1989 | Petzold et al. | 74/867 X |
| 4,916,982 | 4/1990 | Suzuki | 74/866 |
| 4,939,957 | 7/1990 | Asano et al. | 74/866 |
| 4,976,169 | 12/1990 | Sasajima et al. | 74/866 |
| 5,009,129 | 4/1991 | Morimoto et al. | 74/866 |
| 5,012,697 | 5/1991 | Yamashita et al. | 74/866 |

FOREIGN PATENT DOCUMENTS 0253657  1/1988  European Pat. Off.

*Primary Examiner*—Leslie A. Braun
*Assistant Examiner*—Khoi Q. Ta
*Attorney, Agent, or Firm*—Lyon & Lyon

[57] ABSTRACT

A method of controlling speed reduction ratio in a continuously variable speed transmission comprises the steps of setting a prescribed parameter corresponding an accelerator opening which is opened to a certain extent from a fully closed condition setting a reference engine speed corresponding to a parameter which represents a driver's intention of acceleration so as to increase as said parameter increase from said prescribed parameter when said parameter is in a range higher than said prescribed parameter setting said reference engine speed so as to increase as said parameter decreases from said prescribed parameter when said parameter is in a range lower than said prescribed parameter, and controlling said speed reduction ratio so that the engine speed coincides with said reference engine speed.

13 Claims, 3 Drawing Sheets

METHOD OF CONTROLLING SPEED REDUCTION RATIO IN A CONTINUOUSLY VARIABLE SPEED TRANSMISSION

This application is a continuation, of application Ser. No. 270,540, filed Nov. 14, 1988 now abandoned.

BACKGROUND OF THE INVENTION

The present invention relates to a method of controlling a continuously variable speed transmission for controlling the running of a motor vehicle incorporating the continuously variable speed transmission.

One known method of controlling continuously variable speed transmission for controlling the running of a motor vehicle incorporating the continuously variable speed transmission comprises the steps of setting a reference engine rotational speed (referred to as a "running reference engine speed" or a "R-REF engine speed") corresponding to a throttle valve opening of the engine, and controlling the engine speed so as to coincide with the R-REF engine speed (see Japanese Laid-Open Patent Publication No. 62(1987)-237164, for example).

In the above known ratio control, when an accelerator opening (which may refer to the amount of depression of an accelerator pedal or the throttle pedal opening) is not fully closed because of depression of the accelerator pedal or the like, a R-REF engine speed may be set according to the accelerator opening for controlling the speed reduction ratio of the transmission. When the accelerator pedal is not depressed and the accelerator opening is substantially zero (this condition is brought about by applying engine braking for vehicle deceleration), if a R-REF engine speed is set according to the accelerator opening by the above control method, then the engine speed would be too low to obtain a sufficient engine braking power.

For applying an engine brake when the accelerator opening has become substantially zero, it has been conventional practice to set a reference engine speed (referred to as an "engine braking reference engine speed" or an "EB-REF engine speed") for obtaining a desirable engine brake, according to the running speed of the motor vehicle, for controlling the speed reduction ratio.

However, setting the EB-REF engine speed and the R-REF engine speed separately from each other for ratio control is problematic in that the controlling process is complex. Furthermore, when depressing the accelerator pedal while an engine brake is being applied to the motor vehicle thereby to enter a control mode based on the R-REF engine speed, or vice versa, the driver may feel uncomfortable since the reference engine speed is abruptly changed.

SUMMARY OF THE INVENTION

In view of the aforesaid drawbacks of the conventional ratio control methods, it is an object of the present invention to provide a method of controlling speed reduction ratio in transmission for a motor vehicle by setting a reference engine speed according to a parameter representing a driver's intention of acceleration without setting respective ones reference engine speeds for an engine braking mode and a running mode, so that the speed reduction ratio can be controlled smoothly without making the driver feel uncomfortable when an accelerator pedal is depressed while the engine brake is being applied to the motor vehicle.

According to a control method of the present invention, when the parameter is in a range higher than a prescribed parameter valve, the reference engine speed is increased as the parameter increases from the prescribed parameter valve. When the parameter is in a range below the prescribed parameter valve, the reference engine speed is increased as the parameter is lowered from the prescribed parameter valve.

The parameter representing the driver's intention of acceleration can be determined based on an accelerator opening. The prescribed parameter valve corresponds to an accelerator opening which is opened to a certain extent from a fully closed condition.

In the ratio control process, when the parameter is higher than the prescribed parameter valve, the reference engine speed increases as the parameter increases. The speed reduction ratio is so controlled as to increase the vehicle speed as the accelerator pedal is depressed unless the resistance to the running of the motor vehicle is varied greatly. Conversely, when the accelerator pedal is released, the reference engine speed is lowered, and so is the vehicle speed. When the accelerator pedal is further released until the parameter becomes smaller than the prescribed parameter valve, the reference engine speed then increases as the parameter becomes smaller than the prescribed parameter valve. Therefore, if the accelerator pedal is released and the accelerator opening is reduced to substantially zero, the reference engine speed is high enough to apply sufficient engine brake. Since the reference engine speed gradually varies dependent on the parameter of the accelerator opening, the engine speed smoothly increases. If the accelerator pedal is depressed to increase the parameter while the engine brake is being applied, the reference engine speed decreases until the parameter reaches the prescribed parameter valve. Thus the transmission is controlled while the engine speed is varying smoothly.

The term "accelerator opening" used in the description and claims means a parameter representing the driver's intention of acceleration of the motor vehicle, and corresponds to the opening of a throttle valve or the amount of depression of the accelerator pedal. The fully closed accelerator opening corresponds to a condition in which the accelerator pedal is fully released, whereas the fully opened accelerator opening corresponds to a condition in which the accelerator pedal is fully depressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention and wherein.

DESCRIPTION OF THE PREFERRED EMBODIMENTS

Figure 1:
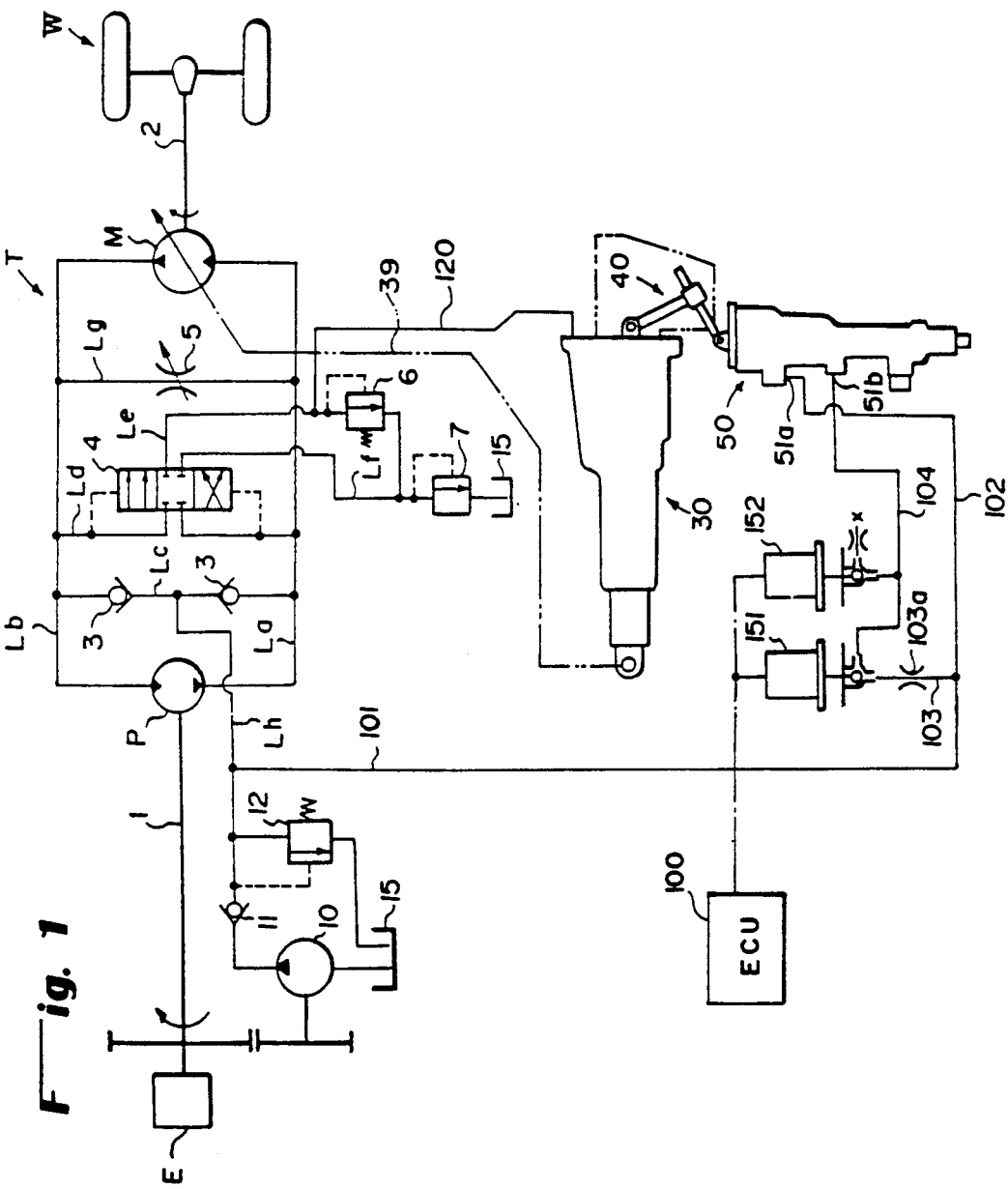
FIG. 1 is a hydraulic circuit diagram of a continuously variable transmission which is controlled by a method according to the present invention.

FIG. 1 shows a hydraulic circuit diagram of a continuously variable speed transmission which is controlled by a method according to the invention. The continuously variable speed transmission has a constant displacement hydraulic pump P driven by the engine E through an input shaft 1 and a variable displacement hydraulic motor M connected to an output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P communicates with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated as to its pressure by a charge pressure relief valve 12 is supplied to either of the two hydraulic lines La or Lb which has a lower pressure, through the check valves 3, 3. A fourth hydraulic line Ld having a shuttle valve 4 is connected to the closed circuit. To the shuttle valve 4 are connected fifth and sixth hydraulic lines Le and Lf which respectively have a high pressure relief valve 6 and a low pressure relief valve 7 with outlets to the oil sump 15. The shuttle valve 4 is a 2-port 3-position selector valve, which is operated in response to a hydraulic pressure difference between the first and second hydraulic lines La and Lb to shift to either of the extreme positions to connect either of the first or second hydraulic lines La, Lb having a higher pressure to the fifth hydraulic line Le as well as to connect the other hydraulic line La or Lb having a lower pressure to the sixth hydraulic line Lf. Therefore, the relief pressure of a higher pressure line is regulated by the high pressure relief valve 6, and the relief hydraulic pressure of the other, lower pressure-side line is regulated by the low pressure relief valve 7. When the pressures in the hydraulic lines La and Lb are equal, the valve 4 is in the central position for closing the line Ld.

Between the first and second hydraulic lines La and Lb is provided a seventh hydraulic line Lg to short-circuit between the first and second hydraulic lines La and Lb. The seventh hydraulic line Lg is provided with a clutch valve 5, which is a variable opening control valve to control the opening degree of the line. Therefore, the opening control of the clutch valve 5 can effect clutch control to control the transmission of driving force from the hydraulic pump P to the hydraulic motor M.

As actuators for displacement control of the hydraulic motor M to control the speed reduction ratio of the continuously variable speed transmission T are provided a first and a second ratio control servo unit 30, 50 which are connected with to each other by means of a link mechanism 40. The hydraulic motor M is of a swash plate axial piston type, and its displacement is changed by the control of swash plate angle by means of the ratio control servo units 30, 50.

The operation of the ratio control servo units 30, 50 is controlled by solenoid valves 151, 152 which are duty-ratio-controlled by signals from a controller 100. The controller 100 receives signals corresponding to a vehicle speed V, a engine speed Ne, a throttle opening θth, a swash plate slant angle θtr of the hydraulic motor M, an accelerator pedal opening θacc operated by the driver, and an atmospheric pressure Pat. Based on these signals, the controller 100 outputs signals for controlling the above solenoid valves so as to effectuate desirable vehicle traveling controls.

Figure 2:
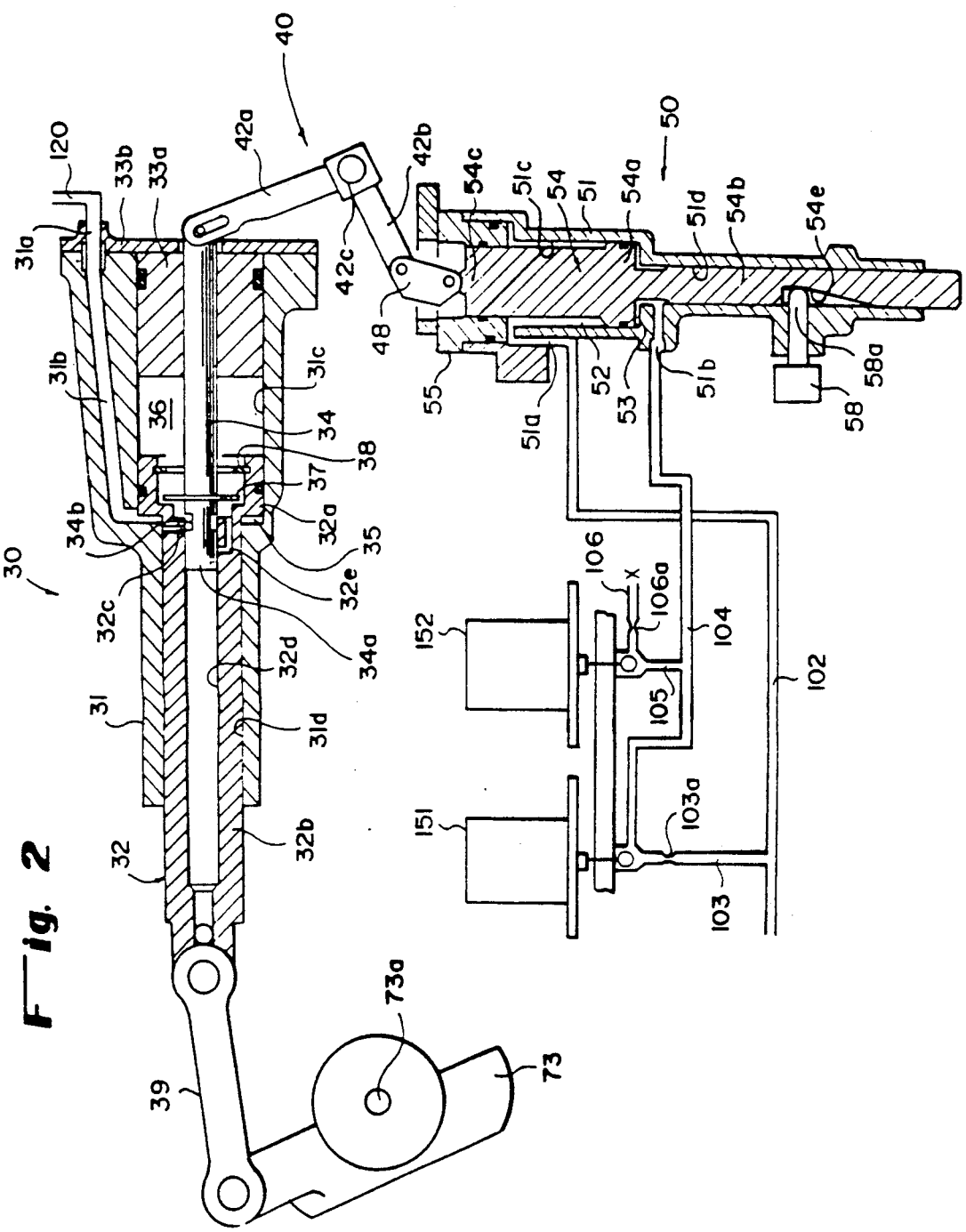
FIG. 2 is a cross-sectional view of first and second ratio control servovalves.

The structures and operations of the above servo units 30, 50 are described in detail below based on FIGS. 1 and 2.

The first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b, having a smaller diameter than that of the cylinder hole 31c, is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d responding to the rightward motion of the spool member 34 and a connection passage 32c which can connect the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulically balanced state because of a pressure balance between the left and right cylinder chambers 35, 36.

As discussed, when the spool member 34 is moved leftward or rightward, the piston member 32 is moved laterally so as to follow the spool member 34 with the help of the high hydraulic pressure fed through the high pressure line 120. Accordingly, the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b, to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 communicate with the upper and lower cylinder chambers 52, 53 through the ports 51a, 51b. The spool member 54 is moved up or down by the difference of hydraulic forces applied to the piston portion 54a which are determined based on the differences of hydraulic pressures and of the areas where the hydraulic pressures in the cylinder chambers 52, 53 are applied. The up and down motions of the spool member 54 are transmitted to the spool member 34 of the first servo unit 30 by the link mechanism 40 causing left and right motions of the spool member 34. In other words, the control of the hydraulic pressures supplied through the hydraulic lines 102, 104 enables control of the motion of the spool member 34 and the piston member 32 in the first servo unit 30 and also enables control of the swash plate angle of the hydraulic motor M and the displacement of the latter. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connected via the port 51a with the upper cylinder chamber 52 is sent through the hydraulic lines 101 and 102 from the delivery line of the charge pump 10 after its pressure is regulated by the charge pressure relief valve 12. The oil pressure in the hydraulic line 104 connected via the port 51b with the lower cylinder chamber 53 is obtained by regulating the oil pressure in a hydraulic line 103 (including an orifice 103a therein), which branches from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the upper cylinder chamber 52 a charge pressure regulated by the charge pressure relief valve 12 is applied through the line 102, while to the lower cylinder chamber 53 is supplied from the line 104 a lower pressure than the charge pressure which is regulated by the first and second solenoid valves 151 and 152. In this connection, since the pressure is applied in the upper cylinder chamber 52 is smaller than that of the lower cylinder chamber 53, the forces of oil pressures in the cylinder chambers 52 and 53 acting on the spool member 54 keep their balance when the oil pressure in the lower cylinder chamber 53 is a specified value P1 which is smaller than the oil pressure Pu in the upper cylinder chamber 52 (Pu>P1). Therefore, when the oil pressure supplied into the lower cylinder chamber 53 from the line 104 is controlled by the first and second solenoid valves 151 and 152 so as to be higher than the above pressure P1, the spool member 54 is moved upward to have a small swash plate angle of the hydraulic motor M, i.e., to have a small speed reduction ratio, while when the oil pressure supplied into the lower cylinder chamber 53 from the line 104 is controlled so as to be smaller than the above pressure P1, the spool member 54 is moved downward to have a big swash plate angle of the hydraulic motor M, i.e., to have a big speed reduction ratio. Further, a speed reduction ration detecting sensor (not shown), which is a potentiometer to detect the swash plate angle, is mounted on the trunnion 73a of the swash plate 73.

Both solenoid valves 151 and 152 are controlled by signals from the controller 100. Only by controlling the operations of the two solenoid valves 151 and 152 based on the signals from the controller 100, the actuations of the first and second ratio control servo units 30 and 50 are controlled, which results is the control of the displacement of the hydraulic motor M, in other words the control of speed reduction ratio.

The speed reduction ratio is controlled so as to equalize an actual engine speed Ne with a reference engine speed Neo which has been set according to an accelerator opening θacc. The reference engine speed Neo is set as shown in FIG. 3.

More specifically, an opening in which the accelerator opening θacc is opened to a certain extent from the fully closed condition is established as a prescribed opening value $\theta_1$, and a reference engine speed $N_1$ corresponding to the prescribed opening value $\theta_1$ is set. The reference engine speed has such characteristics that in an accelerator opening range larger than the prescribed opening value $\theta_1$ (in an opening range), the reference engine speed increases (as indicated by the line A) as the accelerator opening θacc become larger (is progressively opened), and that in an accelerator opening range smaller than the prescribed opening value $\theta_1$ (in a closing range), the reference engine speed increases up to $N_2$ (as indicated by the line B) as the accelerator opening becomes smaller (is progressively closed).

Figure 3:
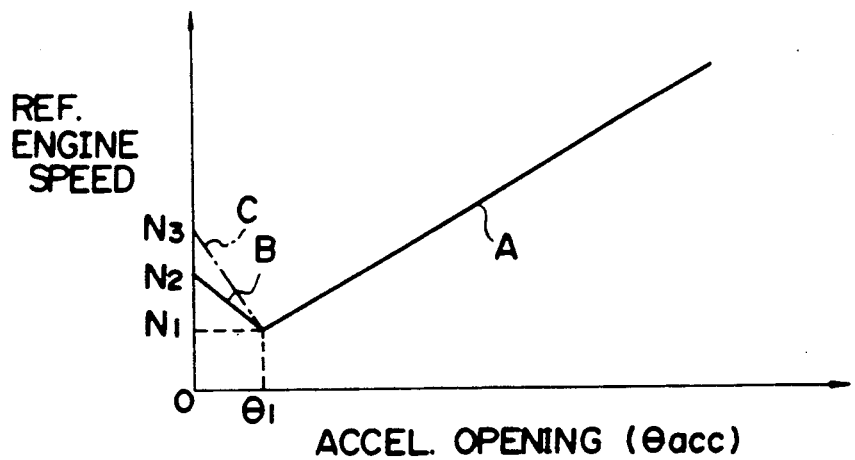
FIG. 3 is a graph showing target engine rotational speeds established with respect to an accelerator opening.
Figure 4:
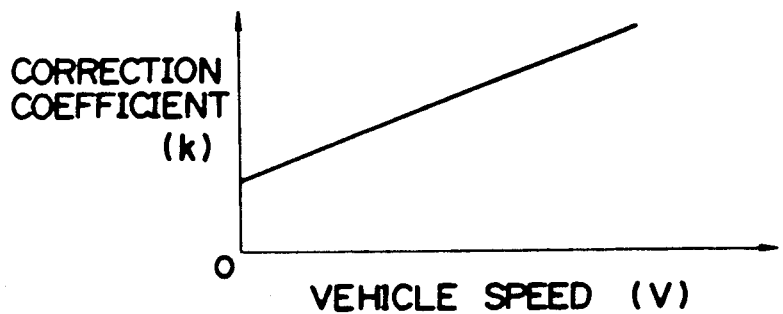
FIG. 4 is a graph showing a corrective coefficient for a reference engine speed with respect to a vehicle speed.

The reference engine speed may be set as represented by only the lines A and B in FIG. 3. However, for better engine braking characteristics, the reference engine speed (indicated by the line B) in the range in which the accelerator opening θacc is smaller than the prescribed opening value $\theta_1$ is corrected by a corrective coefficient "k" dependent on the vehicle speed V as shown in FIG. 4. The corrective coefficient "k" serves to correct the gradient of the line B for applying stronger engine braking as the vehicle speed V becomes higher. Therefore, assuming that the reference engine speed is given according to the line B at a certain vehicle speed, when the vehicle speed is higher than the certain vehicle speed, the gradient of the reference engine speed is increased as indicated by a line C. In this case, when the motor vehicle runs with the accelerator opening θacc being zero, the transmission is controlled to bring the engine speed into accord with $N_3$.

As illustrated in FIG. 3, in this embodiment the correction by the corrective coefficient k of the reference engine speed in the range where the accelerator opening θacc is smaller than the prescribed opening value $\theta_1$ may be expressed in the form of an equation:

$N = N_1 + a*(\theta_{acc} - \theta_1)$; for $\theta_{acc} \geq \theta_1$ $N = N_1 - b*k*(\theta_{acc} - \theta_1)$; for $\theta_{acc} < \theta_1$ where a and b are positive, and k=k(v) (i.e., k is a function of vehicle speed v, as shown in FIG. 4). As shown in FIG. 3, at a certain vehicle speed, k will have a certain value and the above equation will yield the line B. At another vehicle speed, k will have another value and the above equation will yield, for example, the line C in FIG. 3.

Figure 5:
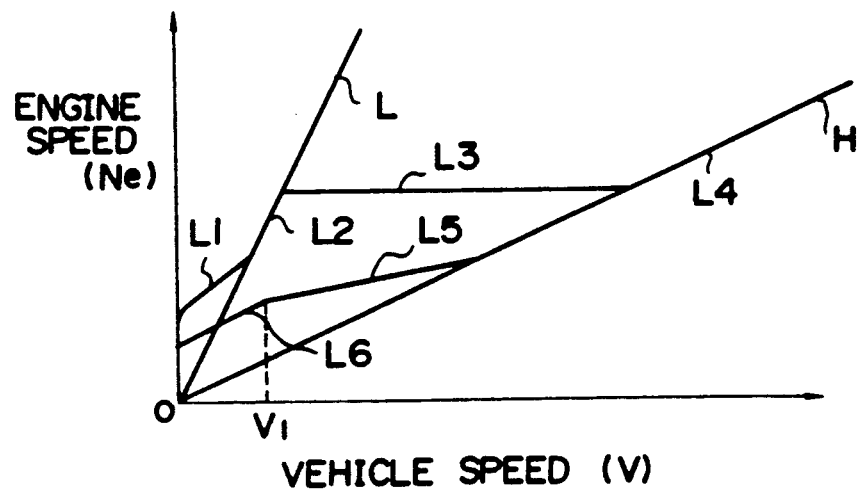
FIG. 5 is a graph illustrating running characteristics of a motor vehicle incorporating the continuously variable speed transmission.

The running characteristics of the motor vehicle achieved when the speed reduction ratio is controlled on the basis of the reference engine speed thus set will be described below with reference to FIG. 5.

For starting the motor vehicle from rest, when the accelerator pedal is depressed, the clutch valve 5 is closed (i.e., the clutch is connected) as indicated by the line $L_1$, and the vehicle speed is increased as indicated by the line $L_2$ as the engine speed rises along the curve L for a maximum speed reduction ratio. Then the vehicle speed is increased as indicated by the line $L_3$ by decreasing the speed reduction ratio while maintaining the reference engine speed corresponding to the accelerator opening θacc. By slowly depressing the accelerator pedal after the vehicle speed has reached the line H for a minimum speed reduction ratio, the vehicle speed is increased along the line $L_4$.

When the accelerator pedal is released to reduce the accelerator opening down to zero while the vehicle is running on the curve $L_4$, the reference engine speed becomes a speed corresponding to the zero accelerator opening shown in FIG. 3. Since the reference engine speed varies dependent of the vehicle speed as shown in FIG. 4, the reference engine speed is slowly lowered as the vehicle speed decreases, so that the speed reduction ratio is controlled as indicated by the line $L_5$ in FIG. 5. When the vehicle speed becomes lower than a preset vehicle speed $V_1$, the clutch valve 5 is opened (i.e., the clutch is disconnected), and the vehicle speed varies as represented by the curve $L_6$.

In the aforesaid control process, if the accelerator pedal is depressed while the motor vehicle is being decelerated with the engine brake as indicated by the curve $L_5$, the reference engine speed is continuously varied as indicated by the curve B (or the curve C) and the curve A in FIG. 3. Therefore, the engine rotational speed varies smoothly, and the driver of the motor vehicle does not feel uncomfortable.

While in the above embodiment the continuously variable speed transmission comprises a the hydraulic pump and a hydraulic motor, the control method of the present invention is not limited to the illustrating continuously variable speed transmission but is also applicable to continuously variable speed transmissions of other types. The apparatus for controlling the speed reduction ratio is not limited to the illustrated electrohydraulic arrangement in which the servo units are operated by controlling the solenoid valve with the electric controller, but may comprise a system for generating a hydraulic pressure dependent on the throttle opening to operate the servo units.

With the control method of the illustrated embodiment, as described above, when the accelerator opening is in a range higher than the prescribed opening, the reference engine speed becomes higher as the accelerator opening increases from the prescribed opening, and when the actuator opening is in a range lower than the prescribed opening, the reference engine speed becomes higher as the accelerator opening decreases from the prescribed opening. Therefore, if the accelerator pedal is released and the accelerator opening is reduced to substantially zero, the reference engine speed is increased and sufficient engine brake can be applied. Inasmuch as the reference engine speed varies dependent of the accelerator opening, the speed reduction ratio can be controlled to increase the engine speed smoothly. Conversely, when the accelerator pedal is depressed while a engine brake is being applied, the reference engine speed is continuously varied, and thus the ratio can be smoothly controlled without making the driver feel uncomfortable. The control process of the present invention is not complicated since the reference engine speed has only one characteristic curve with respect to the accelerator opening.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling speed reduction ratio in a continuously variable speed transmission driven by an engine in a vehicle comprising the steps of:

setting a prescribed value of a parameter representing a driver's intention of acceleration;

setting a reference engine speed corresponding to said parameter so as to increase as said parameter increases from said prescribed parameter value when said parameter is in a range higher than said prescribed parameter value;

setting said reference engine speed so as to increase as said parameter decreases from said prescribed parameter value when said parameter is in a range lower than said prescribed parameter value; and controlling said speed reduction ratio so that an actual engine speed coincides with said reference engine speed.

2. A method of controlling speed reduction ratio as defined in claim 1, wherein said parameter is determined based on an accelerator opening.

3. A method of controlling speed reduction ratio as defined in claim 1, wherein said continuously variable speed transmission comprises a hydraulic pump driven by said engine and a hydraulic motor driven by a hydraulic pressure from said hydraulic pump, at least one of said hydraulic pump and said hydraulic motor being of variable displacement type, whereby said speed reduction ratio can be controlled by controlling the variable displacement of said at least one of the hydraulic pump and the hydraulic motor.

4. A method of controlling speed reduction ratio as defined in claim 1, wherein a gradient of a line representing said reference engine speed with respect to said parameter becomes steeper as a vehicle speed increases when said parameter is in a range lower than said prescribed parameter value.

5. A method of controlling speed reduction ratio as defined in claim 1, wherein a gradient of a line representing said reference engine speed with respect to said parameter is modified by multiplying by a corrective coefficient K, said corrective coefficient K being so set as to become greater as a vehicle speed increases.

6. A method of controlling speed reduction ratio as defined in claim 2, wherein said continuously variable speed transmission comprises a hydraulic pump driven by said engine and a hydraulic motor driven by a hydraulic pressure from said hydraulic pump, at least one of said hydraulic pump and said hydraulic motor being of a variable displacement type, wherein said speed reduction ratio can be controlled by controlling the variable displacement of said at least one of the hydraulic pump and the hydraulic motor.

7. A method of controlling speed reduction ratio as defined in claim 2, wherein a gradient of a line representing said reference engine speed with respect to said parameter becomes steeper as a vehicle speed increases when said parameter is in a range lower than said prescribed parameter value.

8. A method of controlling speed reduction ratio as defined in claim 2, wherein a gradient of a line representing said reference engine speed with respect to said parameter is modified by multiplying by a corrective coefficient K, said corrective coefficient K being so set as to become greater as a vehicle speed increases.

9. A method of controlling a speed reduction ratio in a continuously variable speed transmission in a vehicle according to a parameter representing a driver's intention of acceleration or deceleration of said vehicle, wherein an engine is operatively connected to said transmission, comprising the steps of:

setting a prescribed value of said parameter, setting a reference engine speed of said engine according to a relation between said prescribed value and said parameter, so that if said parameter exceeds said prescribed value, said reference engine speed increases as said parameter increases from said prescribed value, but if said parameter is less than said prescribed value, said reference engine speed increases as said parameter decreases below said prescribed value, and controlling said speed reduction ratio to make an actual engine speed coincide with said reference engine speed.

10. A method of controlling a speed reduction ratio according to claim 9, wherein said parameter corresponds to an opening of an accelerator.

11. A method of controlling a speed reductio ratio according to claim 9, wherein if said parameter is less than said prescribed value, then said reference engine speed is set according to said relation between said prescribed value and said parameter, and according to a speed of said vehicle.

12. A method of controlling a speed reduction ratio according to claim 9, wherein if said parameter is less than said prescribed value, then a rate of change of said reference engine speed with respect to said parameter varies according to a speed of said vehicle.

13. A method of controlling a speed reduction ratio according to claim 12, wherein the rate of change of said reference engine speed with respect to said parameter increases as said vehicle speed increases.

* * * * *